(12) United States Patent
Hamilton et al.

(10) Patent No.: US 10,776,543 B2
(45) Date of Patent: Sep. 15, 2020

(54) AUTOMATED REGION BASED OPTIMIZATION OF CHIP MANUFACTURE

(71) Applicant: INTERNATIONAL BUSINESS MACHINES CORPORATION, Armonk, NY (US)

(72) Inventors: Josiah Hamilton, Poughkeepsie, NY (US); David J. Geiger, Poughkeepsie, NY (US); Mihir Choudhury, New York, NY (US); Alexander J. Suess, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/017,126

(22) Filed: Jun. 25, 2018

(65) Prior Publication Data

US 2019/0392089 A1    Dec. 26, 2019

(51) Int. Cl.
| | |
|---|---|
| *G06F 30/392* | (2020.01) |
| *G06F 30/394* | (2020.01) |
| *G06F 30/327* | (2020.01) |
| *G06F 30/398* | (2020.01) |
| *G06F 119/12* | (2020.01) |

(52) U.S. Cl.
CPC ......... *G06F 30/327* (2020.01); *G06F 30/392* (2020.01); *G06F 30/394* (2020.01); *G06F 30/398* (2020.01); *G06F 2119/12* (2020.01)

(58) Field of Classification Search
USPC ....................................................... 716/104
See application file for complete search history.

(56) References Cited

U.S. PATENT DOCUMENTS

| | | |
|---|---|---|
| 3,777,129 A | 12/1973 | Mehia |
| 6,185,707 B1 | 2/2001 | Smith et al. |
| 6,553,554 B1 | 4/2003 | Dahl et al. |

(Continued)

FOREIGN PATENT DOCUMENTS

EP    1115072 A2    7/2001

OTHER PUBLICATIONS

Elbayoumi et al., "TACUE: A Timing-Aware Cuts Enumeration Algorithm for Parallel Synthesis," Proceedings of the 51st Annual Design Automation Conference, ACM, 2014, 8 pages.

(Continued)

*Primary Examiner* — Bryce M Aisaka
(74) *Attorney, Agent, or Firm* — Cantor Colburn LLP; Erik Johnson

(57) ABSTRACT

Technical solutions are described herein for fabrication of a chip with optimized chip design during the logical synthesis phase of the fabrication. An example method includes optimizing, by a physical synthesis system, a chip design for a chip to be fabricated, the optimization performed according to a first performance metric for the entire chip. The method further includes receiving, by the physical synthesis system, a feedback input comprising a region of the chip and a second performance metric associated with the region. The method further includes modifying, by the physical synthesis system, the chip design by optimizing the region of the chip according to the second performance metric. The method further includes sending, by the physical synthesis system, the modified chip design for fabrication of the chip.

18 Claims, 7 Drawing Sheets

(56) References Cited

U.S. PATENT DOCUMENTS

| | | |
|---|---|---|
| 6,557,153 B1 | 4/2003 | Dahl et al. |
| 6,564,363 B1 | 5/2003 | Dahl et al. |
| 6,564,364 B1 | 5/2003 | Dahl et al. |
| 6,574,788 B1 | 6/2003 | Levine et al. |
| 7,069,528 B2 | 6/2006 | Kovacs et al. |
| 7,146,586 B2 | 12/2006 | Bohl et al. |
| 7,363,605 B1 | 4/2008 | Kondratyev et al. |
| 7,363,607 B2 | 4/2008 | Birch et al. |
| 7,383,522 B2 | 6/2008 | Murgai et al. |
| 7,526,740 B2 | 4/2009 | Bohl et al. |
| 7,673,260 B2 | 3/2010 | Chen et al. |
| 7,962,876 B2 | 6/2011 | Oh et al. |
| 8,104,015 B2 | 1/2012 | Bohl et al. |
| 8,336,013 B2 | 12/2012 | Oh et al. |
| 8,402,405 B1 | 3/2013 | Chang et al. |
| 8,745,567 B1 | 6/2014 | Varadrajan et al. |
| 9,058,452 B1 | 6/2015 | Chang et al. |
| 9,342,642 B1 | 5/2016 | Wang et al. |
| 9,613,173 B1 | 4/2017 | Aggarwal et al. |
| 2002/0093525 A1 | 7/2002 | Asauchi |
| 2002/0166082 A1 | 11/2002 | Ramadei et al. |
| 2003/0149919 A1 | 8/2003 | Greenwald et al. |
| 2004/0194046 A1 | 9/2004 | Singhal et al. |
| 2006/0225009 A1 | 10/2006 | Reddy et al. |
| 2006/0271892 A1 | 11/2006 | Bohl et al. |
| 2008/0222582 A1 | 9/2008 | Bohl et al. |
| 2009/0138837 A1 | 5/2009 | Baumgartner et al. |
| 2009/0327986 A1 | 12/2009 | Goswami et al. |
| 2010/0017187 A1 | 1/2010 | Hira et al. |
| 2010/0251199 A1 | 9/2010 | Baumgartner et al. |
| 2010/0313175 A1 | 12/2010 | Petlin |
| 2012/0060133 A1 | 3/2012 | Krishnan |
| 2012/0072876 A1 | 3/2012 | Salz et al. |
| 2013/0024830 A1 | 1/2013 | Tang et al. |
| 2013/0086539 A1 | 4/2013 | Min et al. |
| 2014/0089874 A1* | 3/2014 | Card ............... G06F 17/505 716/112 |
| 2014/0089875 A1* | 3/2014 | Arora ............... G06F 17/505 716/112 |

OTHER PUBLICATIONS

Golson, "The Human ECO Compiler," Synopsys Users Group Conference, 2004, 57 pages.

* cited by examiner

US 10,776,543 B2

AUTOMATED REGION BASED OPTIMIZATION OF CHIP MANUFACTURE

BACKGROUND

The present invention relates generally to integrated circuit (chip) design, and more specifically, to synthesis of a logical chip design to a physical design. More specifically, the present invention provides performing automated component placement in a hierarchically-defined semiconductor design.

As integrated circuits increase in complexity and functionality, it becomes increasingly useful to adopt a hierarchical approach to their design. A "hierarchical" design is a unit-level design (i.e., the design of the entire circuit—the "unit"—as a whole) is divided into smaller-scale "macro elements," which are themselves composed of smaller, lower-level components or "cells" (which, themselves, may be comprised of even smaller, lower-level components). Hierarchical design aids in the organization of the design process and also helps to avoid unnecessary duplication of work, since a typical circuit design will likely contain multiple copies of a single macro element and will usually contain multiple copies of a single cell.

SUMMARY

Technical solutions are described herein for fabrication of a chip with optimized chip design during the logical synthesis phase of the fabrication. An example method includes optimizing, by a physical synthesis system, a chip design for a chip to be fabricated, the optimization performed according to a first performance metric for the entire chip. The method further includes receiving, by the physical synthesis system, a feedback input comprising a set of regions of the chip and a second performance metric associated with the regions. The method further includes modifying, by the physical synthesis system, the chip design by optimizing the set of regions of the chip according to the second performance metric. The method further includes sending, by the physical synthesis system, the modified chip design for fabrication of the chip.

According to one or more embodiments, a physical synthesis system includes a memory, and a processor coupled with the memory. The processor causes fabrication of a chip using a chip design, wherein fabricating the chip includes optimizing the chip design according to a first performance metric for the entire chip. Fabricating the chip further includes receiving a feedback input comprising a set of regions of the chip and a second performance metric associated with the regions. Fabricating the chip further includes modifying the chip design by optimizing the set of regions of the chip according to the second performance metric. Fabricating the chip further includes sending the modified chip design for fabrication of the chip.

According to one or more embodiments, a computer program product for physical synthesis includes a computer readable storage medium having program instructions embodied therewith. The program instructions are executable by an electronic computer processor to perform optimizing a chip design used for fabricating a chip according to a first performance metric for the entire chip. The program instructions further cause the electronic computer processor to receive a feedback input comprising a set of regions of the chip and a second performance metric associated with the set of regions. The instructions further cause the electronic computer processor to perform modifying the chip design by optimizing the set of regions of the chip according to the second performance metric, and sending the modified chip design for fabrication of the chip.

Additional features are realized through the techniques of the present invention. Other embodiments are described in detail herein and are considered a part of the claimed invention. For a better understanding of the invention with the features, refer to the description and to the drawings.

DETAILED DESCRIPTION

Figure 1:
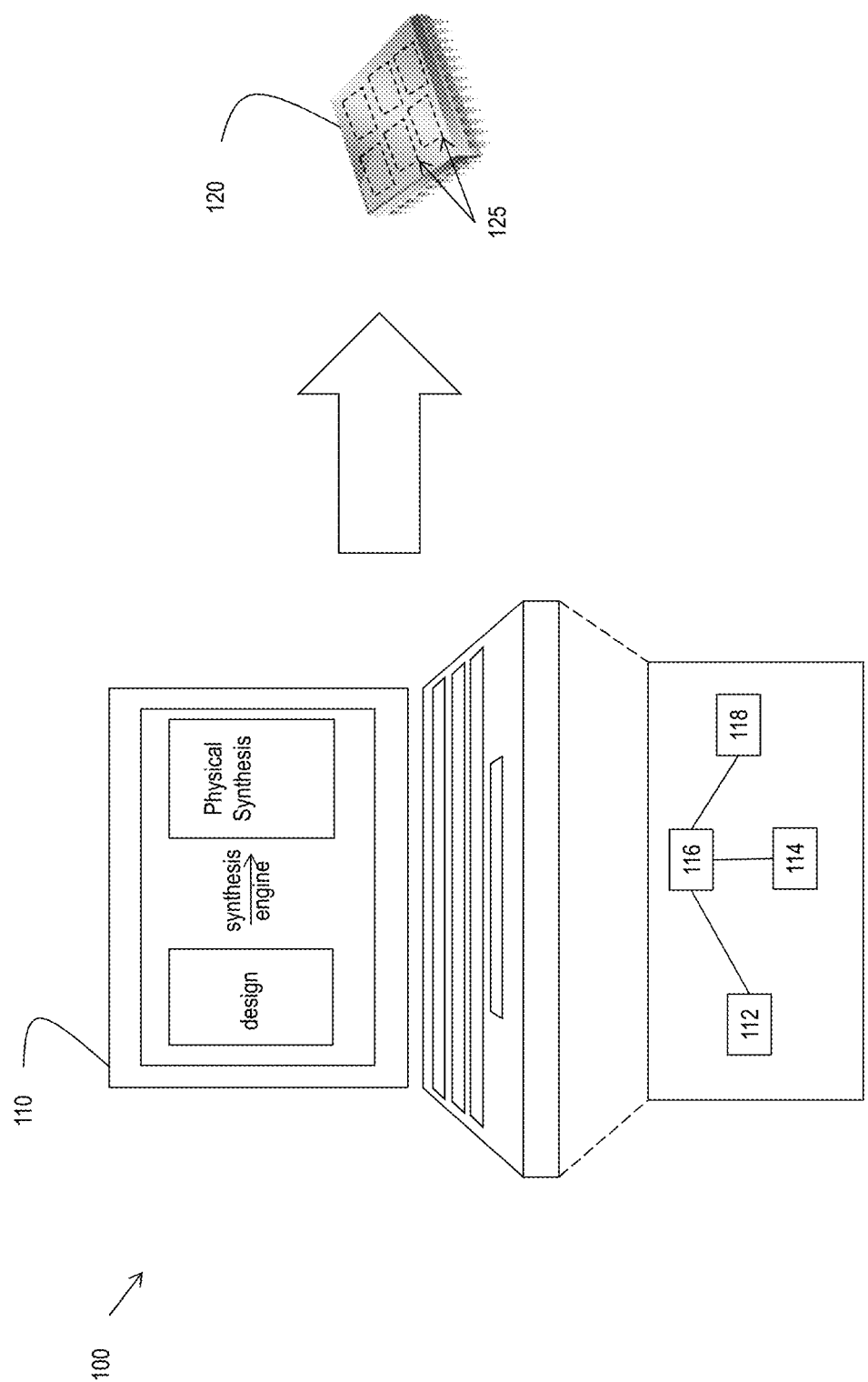
FIG. 1 is a diagram of a physical synthesis system.

Conventional timing closure tools and systems to date do not achieve first-pass timing closure. Several iterations of logical and physical optimization interleaved with manual efforts are typically required to gradually (and slowly) converge to a fully timing closed solution. These numerous iterations of physical synthesis optimization are one of the most significant problems in modern IC design and layout flows. This is referred to as a "TAT" (Turn-Around-Time) issue. There are numerous causes for failure of first-pass timing closure, but one of the biggest causes is the loose integration of (crude) timing models with optimization. There is a long debate regarding whether most timing-driven optimization algorithms should be labeled as timing-influenced rather than timing-driven techniques. This argument is particularly true in timing-driven placement research. Due to the complexity of computation, most of so-called timing-driven placements deploy a crude timing model. The notion of net weighting is a good example. It prioritizes nets based on timing criticality and then a placement algorithm minimizes the weighted sum of total wire length of all nets. Despite its simplicity, net-weight based timing driven placement is still one of the most popular global placement methods deployed in modern timing closure flows.

Meanwhile, there has been a great deal of focus on incremental timing-driven placement techniques with a higher degree of timing accuracy. The favored approach is to formulate the placement problem via linear programming (LP) with timing constraints embedded. Due to the scalability of linear programming formulation, however, incremental placement (as opposed to global placement) is formulated as a linear programming problem. Moreover, LP is flexible to have different objective functions (worst slack or total negative slack or the combination of them) with different timing models. In at least one embodiment, slack is a timing value associated with a connection which indicates the difference between a required time and an arrival time.

The arrival time of a signal can be referred to as the time elapsed for a signal to arrive at a certain point. The reference, or time 0.0, is often taken as the arrival time of a clock signal. To calculate the arrival time, delays of all the components in the path are typically calculated. Arrival times, and indeed almost all times in timing analysis, are normally kept as a pair of values—the earliest possible time at which a signal can change, and the latest.

The required time can be referred to as the latest time at which a signal can arrive without making the clock cycle longer than desired. The computation of the required time proceeds as follows: at each primary output, the required times for rise/fall are set according to the specifications provided to the circuit. Next, a backward topological traversal is carried out, processing each gate when the required times at all of its fanouts are known.

A positive slack "s" at a given node implies that the arrival time at that node may be increased by "s", without affecting the overall delay of the circuit. Conversely, negative slack implies that a path is too slow, and the path must be sped up (or the reference signal delayed) if the whole circuit is to work at the desired speed. While LP is effective for finding the ideal locations of gates according to the timing model employed, placement legalization is still required afterward, which often introduces quite significant perturbation to the previous linear programming solution.

In recent years, the incremental approach has been used to integrate placement optimization with various physical optimizations such as gate sizing, Vt assignment, or even buffering. Placement optimization alone on the physically optimized netlist incurs immediate timing degradation due to wire and sink load changes.

In the integrated approach, subsequent physical optimization can quickly recover from the timing degradation due to placement changes by adjusting the size of gates, layer optimization, Vt types, and buffer insertion or removal.

Various non-limiting embodiments recited herein optimize the chip design by optimizing timing, area, power, and other such factors. Typically, the optimization is a tradeoff between one or more of such factors, for example, timing vs. area; power vs. timing; and so on.

With reference now to FIG. 1, a physical synthesis system 100 configured to synthesize a physical design such as a semiconductor chip, for example, is illustrated according to a non-limiting embodiment. The physical synthesis system 100 includes a processing system 110 (e.g., computer) that implements one or more computer processors such as, for example, an electronic hardware synthesis controller 116 that controls one or more synthesis modules or engine. An input interface 112 (e.g., keyboard, mouse) may be used to develop the logic design which is stored in one or more memory devices 114 of the processing system 110. An output interface 118 (e.g., display, output port) displays a graphical layout or design resulting from the synthesis and/or provides information to place and route components of the physical implementation 120 (e.g., chip). The information includes, but is not limited to, the latch placement location, gate placement location, critical paths, critical gates on the critical path, anchor points, component locations with respect to one or more critical paths, and potential free-space locations, highlighted or emphasized ideal free-space location(s) with respect to a critical path(s) and existing components, and slack benefit values with respect to given free-space.

The physical implementation 120 includes creating components (e.g., transistors, resistors, capacitors) and interconnections therebetween on a semiconductor (e.g., silicon wafer). The physical layout of circuit sub-blocks or physical regions affects the length of a connecting wire between components and, thus, the timing of signals between them, for example. The synthesis controller 116 can include one or more individual sub-modules or sub-controllers that execute a respective physical synthesis operation.

In one or more examples, optimization of the synthesis takes into account feedback based on an optimization that has been identified. The feedback can be automated, for example, by identifying and computing one or more metrics associated with one or more regions, critical points, or other elements of the chip design. Alternatively, or in addition, the feedback includes user feedback via the I/O interfaces 112/118.

The technical solutions described herein improve logic synthesis, which is the process of automatic production of logic components, in particular digital circuits. As chip designs get larger, automation of synthesizing the chips is essential. More importantly, as chip areas shrink, optimizing the designs prior and during the synthesis is important. Typically, the entire design is optimized for one QoR metric, for example, area, power, timing, etc. The optimization of one metric affects, generally adversely, other metrics, for example, area/power vs. timing tradeoff. Further, a technical challenge with optimizing a chip during synthesis is the low accuracy or even lack of certain metrics, such as timing. Typically, until the chip synthesis is completed, the timing cannot be measured, which can make optimizing the timing a challenge. Accordingly, chip designs are, typically, optimized over-aggressively for timing, which in turn, results in additional chip area being used so much that future optimizations cannot recover.

Figure 2:
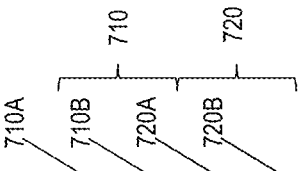
FIG. 2 depicts examples where the chip designs when optimized for timing adversely affect area used.

FIG. 2 depicts examples where the chip designs when optimized for timing adversely affect area used. For example, in each example shown (710 and 720), the optimized chip design (710B and 720B) uses more area for reducing the timing compared to the original chip design (710A and 720A), before the timing optimization. Thus, the timing optimization causes the chip area utilization to increase, and as depicted, cause a congestion metric of the chip to increase. Such an increase can prevent further optimization, such as optimizations for power consumption. Because optimizing the chip design is performed earlier in the flow of chip manufacture, and before detailed information is available, the increase in area utilization and its effects on other optimizations of the chip design are typically not predictable. Determining the optimization is thus limited to levels of logic, fan-out-based models, and connections, without any physicality. Accordingly, a technical challenge exists of optimizing a logic synthesis without substantial increase in area utilization. It should be noted that a timing vs. area utilization example is described herein, however the technical solutions described herein are applicable to any metric, not just timing, or area utilization.

The technical solutions described herein address the lack of accuracy when optimizing the chip design. The technical solutions facilitate improving the focus of optimization within logic synthesis by identifying at least one region of the chip that is failing a performance metric. The identification can be either by user specification or by performing a pass of logic synthesis. The accuracy improvement further includes marking fan-in and fan-out of the identified region(s) when running another pass of logic synthesis, and apply at least one transform on the identified regions, the transform selected so that the performance metric of the region is updated and meets the specification.

Figure 3:
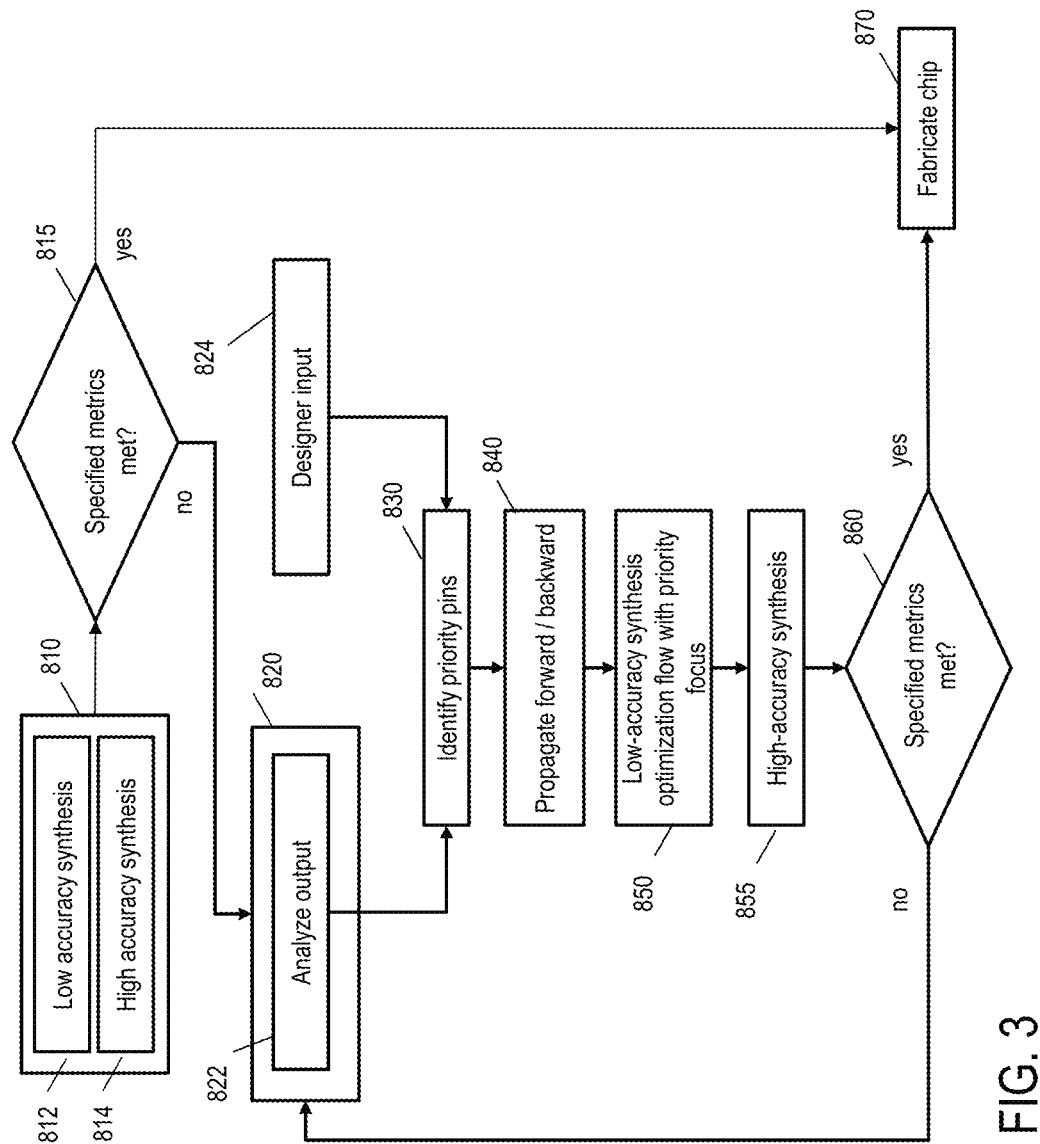
FIG. 3 depicts a flowchart of an example method for optimizing logic synthesis.

FIG. 3 depicts a flowchart of an example method for optimizing logic synthesis. The method includes performing a first pass for a chip design, at 810. The first pass includes a low accuracy synthesis of the chip design, for example, using logic synthesis, at 812. The first pass further includes a high accuracy synthesis, for example, using a physical synthesis, at 814. A typical logic synthesis is performed that includes receiving the chip design and optimizing the design according to a specified first metric, at 810. For example, the specified first metric can be timing. The optimized chip design is used for the high accuracy synthesis, such as the physical synthesis of the chip, at 814. The synthesized chip is analyzed to determine if performance of the synthesized chip satisfies one or more performance metrics including the first metric, at 815.

The optimized design is then used to obtain chip-feedback, at 820. The chip-feedback can include automatic analysis of the optimized design, at 822. Alternatively, or in addition, the chip-feedback can include user specified design input via the I/O interfaces 116/118, at 824. In one or more examples, the process can start with the chip-feedback being provided without the first pass (810). The user specified design input can prune/expand the fed-back regions from the automated analysis, in one or more examples. Alternatively, or in addition, the user specified design input can be for separate regions, other than those from the automated analysis feedback.

The chip-feedback can include boundaries or edges of one or more regions that are to be optimized for a second metric, different from the first metric. For example, the second metric can be area. The identified regions can be provided by specifying particular gates, transistors, or other elements on the chip. Alternatively, or in addition, the regions are identified by specifying particular pins on the chip. In one or more examples, the regions are specified by identifying pins that form the edge/boundary of the region to be optimized for the second metric.

Figure 4:
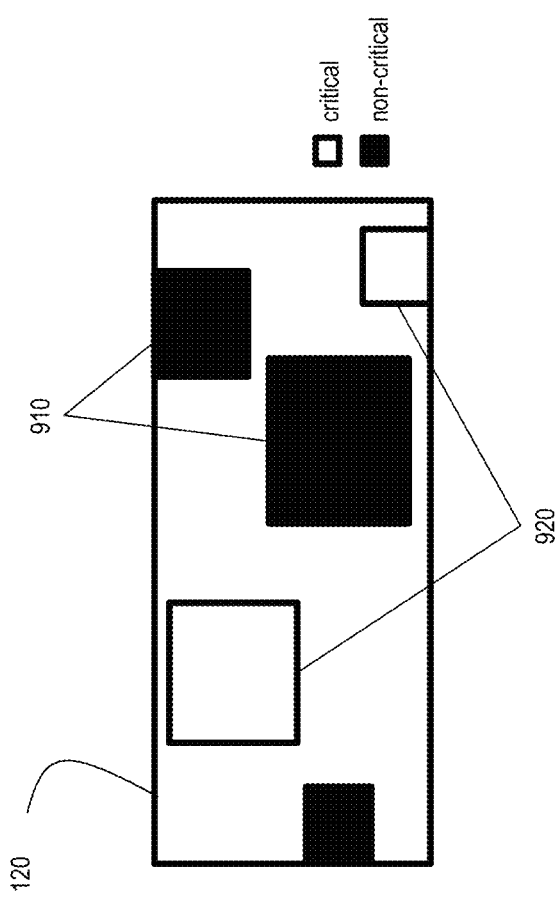
FIG. 4 depicts an example feedback identifying one or more regions.

FIG. 4 depicts an example feedback identifying one or more logical regions. In the illustration, a logical design of the chip 120 is depicted, not the physical implementation that may be obtained after physical synthesis. Accordingly, the depicted regions 910 and 920 are logical regions that are converted into physical regions after performing the physical synthesis using the depicted logical design to fabricate the chip 120. The feedback identifies regions 910 as non-critical or those that are not to be optimized for a second metric. The feedback identifies regions 920 as being critical and which are to be optimized for the second metric. The feedback further can include a threshold/specification of the second metric to be satisfied for the critical regions 920. In one or more examples, each critical region that is to be optimized can have a respective second metric specification to be met. Further, in one or more examples, each critical region 920 that is to be optimized can have a corresponding second metric that is to be optimized. For example, in the ongoing example in which the first metric being optimized is timing, a first critical region 920 can be optimized for area, and a second critical region 920 can be optimized for power. In other examples the timing can be a second metric that is optimized for one or more specific regions 920. It should be noted that the number of critical and non-critical regions depicted in FIG. 9 are exemplary and that in other examples different number of regions can be identified. Further, in one or more examples, the non-critical regions 910 are not identified, and only the critical regions 920 and the corresponding optimization specification is provided as the feedback.

Referring back to FIG. 3, the method further includes identifying priority pins in the critical regions 920 that are to be optimized, at 830. Identifying the priority pins includes determining the pins that mark the boundary of the critical regions 920. The critical pins can be identified based on parsing the design/specification of the chip 120. In one or more examples, the critical pins of the regions 920 are provided when identifying the critical regions 920 in the feedback. The metric specifications/thresholds for a region 920 is associated or measured at one or more priority pin in the region 920.

The method further includes propagating forward/backward to identify additional regions that are associated with the critical regions 920, at 840. For example, the performance of the critical region 920 that is identified for optimization can depend on the performance of another region that is not identified. Accordingly, the additional regions are identified that are associated with the critical regions 920. In one or more examples, the additional regions can be identified using known techniques such as cone extraction, cone intersection, union, or complement, and the like. It should be noted that a "region" as used herein is a logical region encompassing logical gates, and may be different from a set of gates that are synthesized on the chip.

Figure 5:
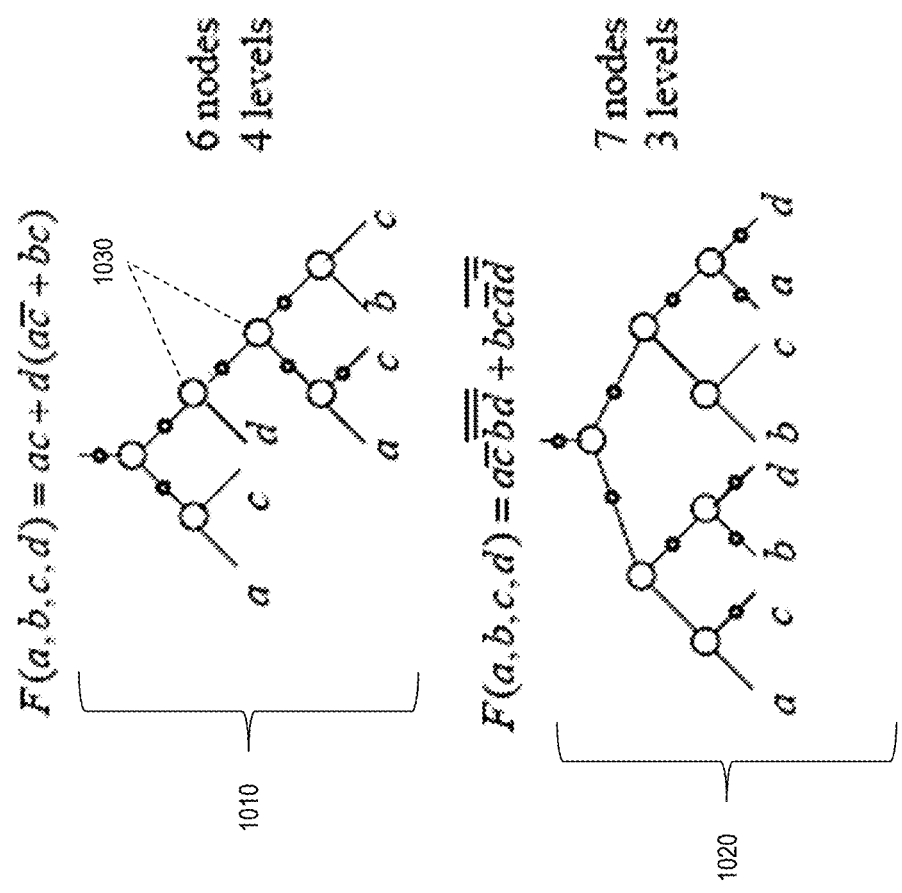
FIG. 5 depicts a transformation of a region of a chip design.

Further, the critical regions 920 are optimized for the corresponding specified second metric, for example, using a low-accuracy synthesis optimization flow with priority focus, at 850. The low-accuracy synthesis is performed using various low-accuracy analysis known in the art during the logic synthesis phase and in the early physical synthesis phase. The optimization uses any one or more optimization techniques that are known to transform a region to optimize the specified metric using the identified priority pins of the critical regions 920. For example, techniques used to optimize the critical regions 920, in the low-accuracy synthesis, can include those described herein, such as the logical transforms. The logical transformation can include rearranging the one or more gates in the critical region 920. FIG. 5 depicts a transformation of a logical region 920 of a chip where a region 1010 is optimized and transformed into a region 1020. The regions 1010 and 1020 both result in the same calculation F(a, b, c, d) as depicted, however the transformed region 1020 reduces the time taken to perform the calculation, however requires more chip area (7 nodes vs. 6 nodes) when compared to the region 1010. Here, each node 1030 can be a gate to perform the Boolean operation depicted by F.

In one or more examples, in case two or more critical regions 920 are identified, the identified critical regions 920 are optimized sequentially based on a predetermined priority list.

Once the critical regions optimization is completed, the method includes performing a high-accuracy synthesis by performing a physical synthesis using the optimized chip design, at 855. Further, the physically synthesized chip is analyzed to determine if the specified metrics are satisfied, at 860. The check includes determining if the specified second metrics are met for the critical regions 920. The check further includes determining if the specified first metric is met for the entire chip 120. If the thresholds (i.e. the specified metrics) are met, the chip design is used for fabricating the chip 120, at 870. Alternatively, if one or more of the thresholds are not met, the method loops back to repeat receiving further feedback and revising the chip design as described herein.

In one or more examples, the second feedback received upon looping back can be different than the earlier (first) feedback that was used to transform the chip design. For example, the second feedback can identify a different region as a critical region 920, or provide a different threshold to satisfy for the first/second metrics.

The technical solutions described herein address a lack of accuracy in all of logic synthesis as well as early, low-accuracy, steps of physical synthesis. Accordingly, it should be noted that although the flowchart in FIG. 3 depicts a particular sequence of steps performed in an exemplary embodiment, in other examples, any low-accuracy step in the optimization flow can use any of the previous runs to identify high-priority regions of optimization for a certain metric. For example, the output of a previous run can be input and analyzed via the feedback (820) to determine region(s) that are too large in area ("fail area"), region(s) that are too slow ("fail timing"), and other such regions in the chip design. Along with the regions, the corresponding set of metrics (area, timing, power, congestion) is also provided in each feedback. A different set of regions associated with each metric may be fed-back in each iteration. In one or more examples, the set of regions for a specific metric can be empty if there are no points that fail that specific metric at the end of an iteration of the synthesis (logic synthesis+ physical synthesis).

Figure 6:
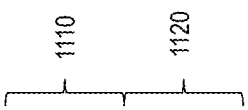
FIG. 6 depicts examples where the chip designs when optimized using the logic synthesis optimization.

FIG. 6 depicts examples where the chip designs when optimized using the logic synthesis optimization described herein. As seen the optimization facilitates improving the timing metric and the area utilization in the optimization case 1110. In some cases the area utilization does not change although the timing improves in the case 1120. Accordingly, the logic synthesis optimization as described herein can facilitate improving more than one performance metric associated with the chip, or at least mitigate adverse effects on a second performance metric when optimizing a first performance metric.

The technical solutions described herein accordingly facilitate an automated way of using information from a previous logic synthesis run to improve the logic synthesis quality in subsequent runs. The technical solutions described herein further facilitate the logic synthesis to control how the design is optimized more finely than typical optimizations. The technical solutions described herein provide automated sub-setting of chip design, which mitigates challenges posed to designers because of chip design scale.

The technical solutions described herein provide the advantages described herein by facilitating rerun of logic synthesis or changing which optimizations are being used for one or more regions of the chip design. The technical solutions described herein identify at least one region of the chip design which is failing a design metric, either by user-specification or by performing a pass of physical synthesis. Further, a fanin and fanout of the region(s) are marked when running another pass of logic synthesis. Further yet, at least one transform is applied to the region(s) to adjust the design metric in the desired/specified range. The design metrics can be one of area, congestion, timing (cap violations, slew, slack), power, and the like. The region information can be fed back in multiple ways, which is then used to determine/mark critical points in the region that are to be transformed to optimize the design metric.

Figure 7:
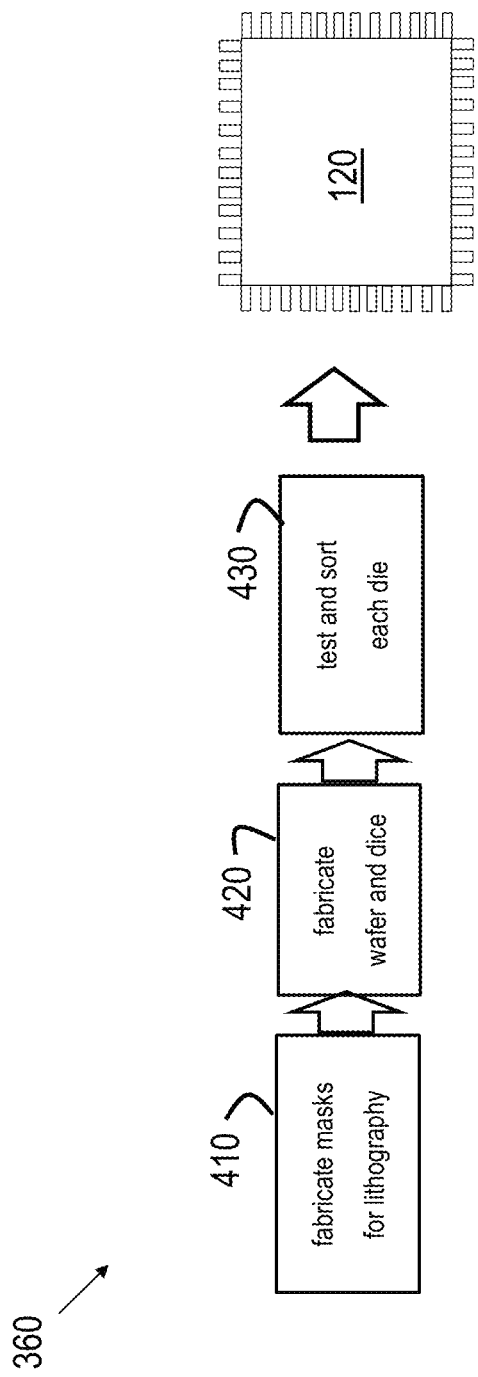
FIG. 7 is a process flow of a method of fabricating the integrated circuit 120 designed according to one or more embodiments of the invention

FIG. 7 is a process flow of a method of fabricating the integrated circuit 120 designed according to one or more embodiments of the invention. Once the physical design data is obtained, based, in part, on performing automated region based optimization of the chip design during logic synthesis and/or during higher-level timing analysis according to one or more embodiments of the invention, the processes shown in FIG. 7 can be performed to fabricate the integrated circuit 120. Generally, a wafer with multiple copies of the final design is fabricated and cut (i.e., diced) such that each die is one copy of the integrated circuit 120.

At block 410, the processes include fabricating masks for lithography based on the finalized physical layout. At block 420, fabricating the wafer includes using the masks to perform photolithography and etching. Once the wafer is diced, testing and sorting each die is performed, at block 430, to filter out any faulty die.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for physical synthesis, the method comprising:
    optimizing, by a physical synthesis system, a chip design for a chip to be fabricated, the optimization performed according to a first performance metric for the entire chip;
    receiving, by the physical synthesis system, a feedback input comprising a set of regions of the chip and a second performance metric associated with the set of regions, the feedback input including a first feedback input configured to indicate a fail region among the set of regions and a second feedback input comprising the set of regions of the chip and a third performance metric associated with said set of regions;
    modifying, by the physical synthesis system, the chip design by optimizing the set of regions of the chip according to the second performance metric; and
    sending, by the physical synthesis system, the modified chip design for fabrication of the chip.

2. The method of claim 1, wherein optimizing the region comprises rearranging one or more electrical components in the set of regions.

3. The method of claim 2, wherein the set of regions includes a first region, and modifying the chip design further comprises:
    determining a second region that is associated with the first region; and
    optimizing the second region of the chip according to the second metric.

4. The method of claim 1, wherein the first metric is one from a group comprising timing, power, area, and congestion.

5. The method of claim 4, wherein the second metric is different from the first metric, and the second metric is one from the group comprising timing, power, area, and congestion.

6. The method of claim 1, wherein the feedback input is received from a user.

7. A physical synthesis system comprising:
    a memory; and
    a processor coupled with the memory, the processor configured to cause fabrication of a chip using a chip design, wherein fabricating the chip comprises:
    optimizing the chip design according to a first performance metric for the entire chip;
    receiving a feedback input comprising a set of regions of the chip and a second performance metric associated with the set of regions, the feedback input including a first feedback input configured to indicate a fail region among the set of regions and a second feedback input comprising the set of regions of the chip and a third performance metric associated with said set of regions;

modifying the chip design by optimizing the set of regions of the chip according to the second performance metric; and sending the modified chip design for fabrication of the chip.

8. The physical synthesis system of claim 7, wherein optimizing the set of regions comprises rearranging one or more electrical components in the regions.

9. The physical synthesis system of claim 8, wherein the set of regions includes a first region, and modifying the chip design further comprises:

determining a second region that is associated with the first region; and optimizing the second region of the chip according to the second metric.

10. The physical synthesis system of claim 7, wherein the first metric is one from a group comprising timing, power, area, and congestion.

11. The physical synthesis system of claim 10, wherein the second metric is different from the first metric, and the second metric is one from the group comprising timing, power, area, and congestion.

12. The physical synthesis system of claim 7, wherein the feedback input is received from a user.

13. A computer program product for physical synthesis, the computer program product comprising a computer readable storage medium having program instructions embodied therewith, the program instructions executable by an electronic computer processor to perform:

optimizing a chip design used for fabricating a chip according to a first performance metric for the entire chip;

receiving a feedback input comprising a set of regions of the chip and a second performance metric associated with the set of regions, the feedback input including a first feedback input configured to indicate a fail region among the set of regions and a second feedback input comprising the set of regions of the chip and a third performance metric associated with said set of regions;

modifying the chip design by optimizing the set of regions of the chip according to the second performance metric; and sending the modified chip design for fabrication of the chip.

14. The computer program product of claim 13, wherein optimizing the set of regions comprises rearranging one or more electrical components in the regions.

15. The computer program product of claim 14, wherein the set of regions includes a first region, and modifying the chip design further comprises:

determining a second region that is associated with the first region; and optimizing the second region of the chip according to the second metric.

16. The computer program product of claim 13, wherein the first metric is one from a group comprising timing, power, area, and congestion.

17. The computer program product of claim 16, wherein the second metric is different from the first metric, and the second metric is one from the group comprising timing, power, area, and congestion.

18. The computer program product of claim 13, wherein the feedback input is received from a user.

* * * * *